July 7, 1970   M. WOODING   3,518,723
DIES FOR USE IN MANUFACTURING PELLETS AND
TO APPARATUS INCLUDING SUCH DIES
Filed April 24, 1968   3 Sheets-Sheet 1

July 7, 1970 M. WOODING 3,518,723
DIES FOR USE IN MANUFACTURING PELLETS AND
TO APPARATUS INCLUDING SUCH DIES
Filed April 24, 1968 3 Sheets-Sheet 2

United States Patent Office 3,518,723
Patented July 7, 1970

3,518,723
DIES FOR USE IN MANUFACTURING PELLETS AND TO APPARATUS INCLUDING SUCH DIES
Maurice Wooding, Norwich, England, assignor to Dreibholz & Company Limited, Dereham, Norfolk, England, a corporation of Great Britain
Filed Apr. 24, 1968, Ser. No. 723,745
Claims priority, application Great Britain, May 5, 1967, 20,933/67; Apr. 3, 1968, 15,937/68
Int. Cl. B29f 3/04; B29d 1/03
U.S. Cl. 18—12                                14 Claims

ABSTRACT OF THE DISCLOSURE

In the manufacture of pellets of material the material is forced through pellet-forming apertures having walls constituted by polytetrafluoroethylene loaded with a compatible strengthening material in powdered form, or by a material having essential properties similar to such loaded polytetrafluoroethylene. The loaded polytetrafluoroethylene or similar material is protected from the pressure used to force the material through the pellet-forming apertures by a metallic facing which is replaceably secured within the die ring which contains the pellet-forming apertures, and which has apertures corresponding to the pellet-forming apertures, and located so as to define the inlets to the pellet-forming apertures. The pellet-forming apertures may be apertures in an annular body or, alternatively, the pellet-forming apertures may be defined by the apertures in plugs of loaded polytetrafluoroethylene or similar material, the plugs being located on a ring former.

CROSS REFERENCE

In co-pending U.S. patent application Ser. No. 599,930 now U.S. Pat. 3,447,486 there is described a new proposal for a die for use in manufacturing pellets of material. This proposal involves the use of polytetrafluoroethylene as a primary constituent of the die ring. The great advantage which is derived from the use of polytetrafluoroethylene as the material through which the pellet-forming apertures extend is in the low coefficient of friction which the polytetrafluoroethylene exhibits and which reduces to a very great extent the degree of wear which occurs along the walls of the pellet-forming apertures. The life of the die is therefore substantially increased and the low co-efficient of friction of the polytetrafluoroethylene also results in the power necessary to force the material through the pellet-forming apertures being greatly reduced.

SUMMARY OF THE INVENTION

In accordance with the present invention the applicant proposes an improvement in a die ring based on a material such as polytetrafluoroethylene including a compatible strengthening material in powdered form, the improvement being such as to ensure that the inlets to the pellet-forming apertures are clearly defined, whilst retaining all the advantages of the properties of polytetrafluoroethylene or similar materials to form the walls of the apertures within which the pellets are formed and from which they emerge with a shiny surface.

According to the present invention there is provided a die for use in manufacturing pellets of material comprising a die ring which contains pellet-forming apertures, wherein the pellet forming apertures have walls constituted by polytetrafluoroethylene loaded with a compatible strengthening material in powdered form, or by a material having essential properties similar to such loaded polytetrafluoroethylene, and wherein a replaceable metallic facing has apertures corresponding to the pellet-forming apertures and so located as to define the inlets to the pellet-forming apertures.

In this specification including the claims the term "loaded polytetrafluoroethylene" is used to denote polytetrafluoroethylene with a compatible strengthening or reinforcing material which is in powdered form. The polytetrafluoroethylene is a sintered granular material and the compatible strengthening material is in a similar powdered or granular form which can be readily mixed with polytetrafluoroethylene.

The main property of the loaded polytetrafluoroethylene which it is essential to have present in any similar material which is used in substitution for the loaded polytetrafluoroethylene is a relatively low co-efficient of friction. In addition the material should have a reasonable temperature resistance in order to permit of continuous working of the die—this property and the low co-efficient of friction are inherent in polytetrafluoroethylene—and reasonable abrasion resistance, dimensional stability and resistance to cold flow, which properties are present in the loaded polytetrafluoroethylene as a result of the presence of the compatible strengthening material in powdered form. Preferably the strengthening material is powdered glass, obtained by grinding glass fibres to a powder, but alternatively the strengthening material may be a powdered metallic material, for example stainless steel granules.

Examples of materials which have essential properties for use in a die ring similar to the essential properties of loaded polytetrafluoroethylene are polyacetal resins, for example those obtainable under the registered trademarks Delrin and Hostaform, and some forms of nylon, for example Nylon Type 6.2 Grade 21, Nylon Type 11 Grade 51 and Nylon Type 12 Grade 55.

Further according to the present invention there is provided a die for use in manufacturing pellets of material, wherein the die ring which contains the pellet-forming apertures is comprised by an inner replaceable metallic facing and an outer body of loaded polytetrafluoroethylene, the pellets being essentially formed in contact with polytetrafluoroethylene walls to the pellet-forming apertures.

Advantageously the die is made from a die ring as recited above mounted between metallic flanges. Preferably the replaceable metallic facing has extension flanges having screw threads for co-operating with corresponding screw threads on the metallic flanges whereby the die comprising the die ring and the metallic flanges is assembled.

In accordance with a preferred embodiment of die for manufacturing pellets particularly of a small diameter, for example a diameter of $11/64$ of an inch, a circumferential band surrounds the die ring in close contact with the outer circumferential surface of the die ring and prevents separation of the die ring from the metallic facing, the metal band having apertures in alignment with the pellet-forming apertures and of greater diameter than the pellet-forming apertures.

When the pellets which are to be manufactured are of a relatively large diameter, for example $5/16$ of an inch or larger, the die which is used for manufacturing these pellets may comprise a metallic ring former, plugs of loaded polytetrafluoroethylene located in the ring former and defining pellet-forming apertures therein, and a replaceable metallic facing secured to the inner surface of the ring former and having apertures leading to the pellet-forming apertures defined by the polytetrafluoroethylene plugs.

More specifically according to this aspect of the present invention there is provided a die for use in manufacturing pellets of material comprising a ring former of metal having apertures therethrough of a size greater than the diameter of the pellets which are to be formed, the ring former having a countersunk area around the inner end of each aperture, plugs of loaded polytetrafluoroethylene located one in each aperture including the countersunk area and defining a pellet-forming aperture, and a replaceable metallic facing located within the ring former, secured in contact with the ring former and the polytetrafluoroethylene plugs, and having apertures in alignment with the pellet-forming apertures.

It is preferred for the apertures in the metallic facing, which is conveniently a facing of stainless steel, to be funnelled so as to have a diameter which decreases in the direction from the inner surface of the metallic facing to the outer surface. Advantageously the diameter of each funnelled aperture in the metallic facing at the outer surface of the facing is substantially equal to the diameter of the pellet-forming aperture in the polytetrafluoroethylene.

The loaded polytetrofluoroethylene may contain from 10% to 90% by weight of the compatible strengthening material, but preferably the compatible strengthening material is present in a range from 10% to 60% by weight of the composition. In one specific embodiment the polytetrafluoroethylene is loaded with compatible strengthening material in a ratio of two parts by weight of strengthening material to three parts by weight of polytetrafluoroethylene.

The compatible strengthening material which is used to load the polytetrafluoroethylene may comprise stainless steel granules, but preferably powdered glass is used as the compatible strengthening material because powdered glass is in general a finer material than metallic particles or granules.

The present invention further comprehends apparatus for manufacturing pellets of material comprising a die in accordance with the invention and rotatable rollers for urging material through the pellet-forming apertures.

DESCRIPTION OF THE VIEWS OF THE DRAWINGS

In order that the present invention may be better understood some embodiments thereof will be described, by way of example, with reference to the accompanying drawings, in which.

In the drawings the same or similar parts are designated by like reference numerals.

DETAILED DESCRIPTION

Figure 1:
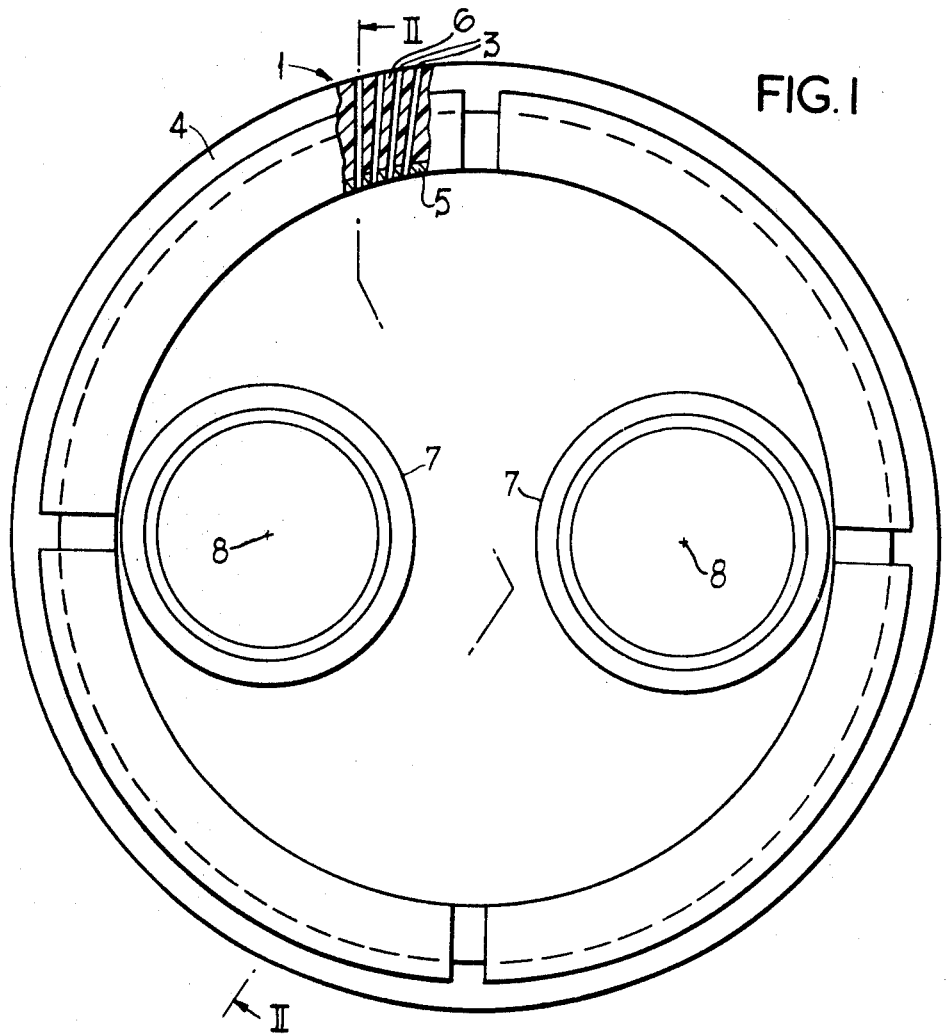
FIG. 1 shows in part section apparatus for manufacturing pellets of material comprising a die in accordance with the present invention.
Figure 3:
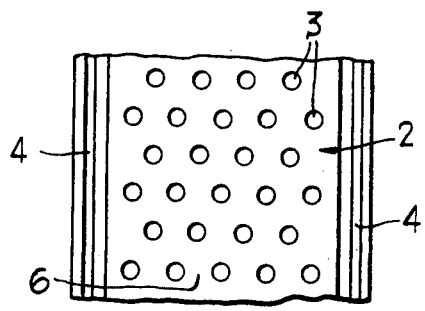
FIG. 3 is a fragmental view of the outside of the die ring of FIGS. 1 and 2.
Figure 2:
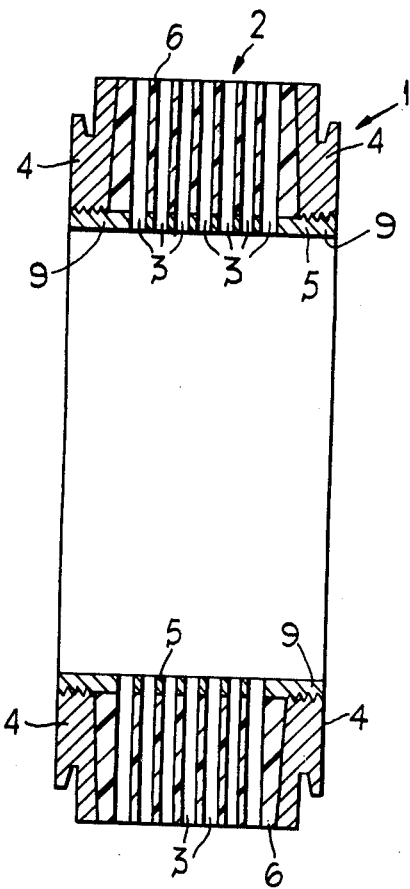
FIG. 2 is a section of a part of the die of FIG. 1 taken along the line II—II.

Referring first to FIGS. 1 to 3 of the drawings the apparatus for manufacturing pellets of material comprises a die indicated generally by the reference numeral 1. The die 1 consists of a die ring 2 containing pellet-forming apertures 3 mounted between metallic flanges 4 in a manner which will be described below. In accordance with the present invention the die ring 2 comprises an inner metallic facing 5 and an outer body 6 based on polytetrafluoroethylene, for example polytetrafluoroethylene loaded with powdered glass.

The apparatus for manufacturing pellets further comprises rollers 7 mounted to be rotatable about their longitudinal axes 8. The rollers 7 preferably have surfaces of hardened steel. A clearance between surfaces of the rollers 7 and the inner circumference of the die ring 2, which is the inner surface of the metallic facing 5, is provided, and as the material to be formed into pellets is fed axially into the apparatus this material engages between the driven die 1 and the rollers 7 with the result that rollers 7 are rotated and the material is forced through the pellet-forming apertures 3. Suitable lengths of pellet are obtained by the action of a knife (not shown) located immediately beyond the outer circumference of the die ring 2.

As shown in FIG. 2 of the accompanying drawings the metallic facing 5, which is preferably a stainless steel bearing ring, has a greater width than the body 6 of polytetrafluoroethylene, so that the metallic facing 5 effectively forms flanges 9 on the die ring 2. The flanges 9 are provided on their outer surfaces with screw threads arranged to co-operate with screw threads on the inner surfaces of the metallic flanges 4. Consequently the die which is illustrated in FIGS. 1 to 3 is assembled by screwing the metallic flanges 4 on to the flanges 9 of the metallic facing 5 with the body 6 which is based on polytetrafluoroethylene and which contains the effective surfaces of the pellet forming apertures 3, already positioned around the metallic facing 5 and between the metallic flanges 4.

The body 6 of polytetrafluoroethylene, which is a ring, is shaped so that its side surfaces may co-operate with the metallic flanges 4 to be held by the metallic flanges 4. The side surfaces of the body 6 may, for example, be stepped, but in the embodiment ilustrated the body 6 is shaped so as to have a greater width at its inner circumference than at its outer circumference. The metallic flanges 4 have complemental co-operating edges so that the metallic flanges 4 retain the body 6 of polytetrafluoroethylene in position when they are screwed up against it by screwing on the flanges 9 of the metallic facing 5.

The metallic facing 5, which has apertures corresponding to the pellet-forming apertures 3 of the body 6 based on polytetrafluoroethylene, therefore defines the inlets to the pellet-forming apertures. Accordingly the main pressure placed on the material to be pelleted by the rollers 7 is taken on the metallic facing 5, and the metallic facing 5 will wear around the apertures through it. These apertures may be funnelled or tapered so that they are wider at the inner surface of the metallic facing 5 than at the outer surface of the facing. Such tapered apertures in the facing 5 channel the material to be pelleted neatly into the actual pellet-forming apertures which are the apertures 3 in the body 6 of loaded polytetrafluoroethylene.

When the metallic facing 5 has worn so that force applied to the material to be pelleted by the rollers 7 is being directed on the polytetrafluoroethylene, the worn metallic facing 5 may be replaced by unscrewing the metallic flanges 4 and then separating the worn metallic facing 5 from the body 6 of polytetrafluoroethylene and then inserting a new metallic facing 5 and reassembling the die which comprises the metallic facing 5, the metallic flanges 4 and the body 6 of polytetrafluoroethylene.

In spite of the presence of the metallic facing 5, which, until it is worn, takes the main pressure applied to the die by the rollers 7 through the material to be pelleted, the frictional force which is inevitably set up by the material as it is passing through the pellet-forming apertures 3 tends to separate the body 6 of polytetrafluoroethylene from the metallic facing 5 and so to create a gap in which the material to be pelleted accumulates. The presence of such a gap inevitably causes wearing of the body 6 of polytetrafluoroethylene around those parts of the apertures 3 adjacent to the inner surface of the polytetrafluoroethylene body 6.

In order to avoid such a tendency for separation, or at least to reduce it substantially, the original construction of the metallic facing 5 and the body 6 of polytetrafluoroethylene in the die illustrated in FIGS. 1 to 3 is made in the following way. It will be understood that the dimensions quoted are examples for one particular die, but the principle illustrated is adaptable to dies of other sizes.

The body 6 of polytetrafluoroethylene is made to have an internal diameter of 11¾ inches, but one edge of its internal surface, which edge is outside the area where the pellet-forming apertures 3 are present, is chamfered so that the internal diameter of the body 6 at the edge of the chamfer is approximately 12¼ inches. The metallic facing 5 is a ring having an internal diameter of 12 inches and an external diameter of 12¼ inches, the wall thickness of the metallic facing 5 being ¼ of an inch. The metallic facing 5 is positioned within the body 6 of polytetrafluoroethylene as a force fit by placing the metallic facing on the chamfered edge of the body 6 of polytetrafluoroethylene and applying the pressure necessary, which is of the order of 21 tons, to force the metallic facing 5 into the interior of the body 6 of polytetrafluoroethylene until the apertures in the metallic facing 5 are aligned with the pellet-forming apertures 3 in the body 6.

After some period of use it is found that, despite the considerable pressure which results from this force fit and which urges the inner circumferential surface of the body 6 of polytetrafluoroethylene and the outer circumferential surface of the metallic facing 5 against one another, some separation of the body 6 of polytetrafluoroethylene from the metallic facing 5 is liable to occur. A preferred embodiment of the invention, particularly for dies having pellet-forming apertures of relatively small dimension such as 11/64 of an inch, is illustrated in FIGS. 4 and 5 of the accompanying drawings.

Figure 4:
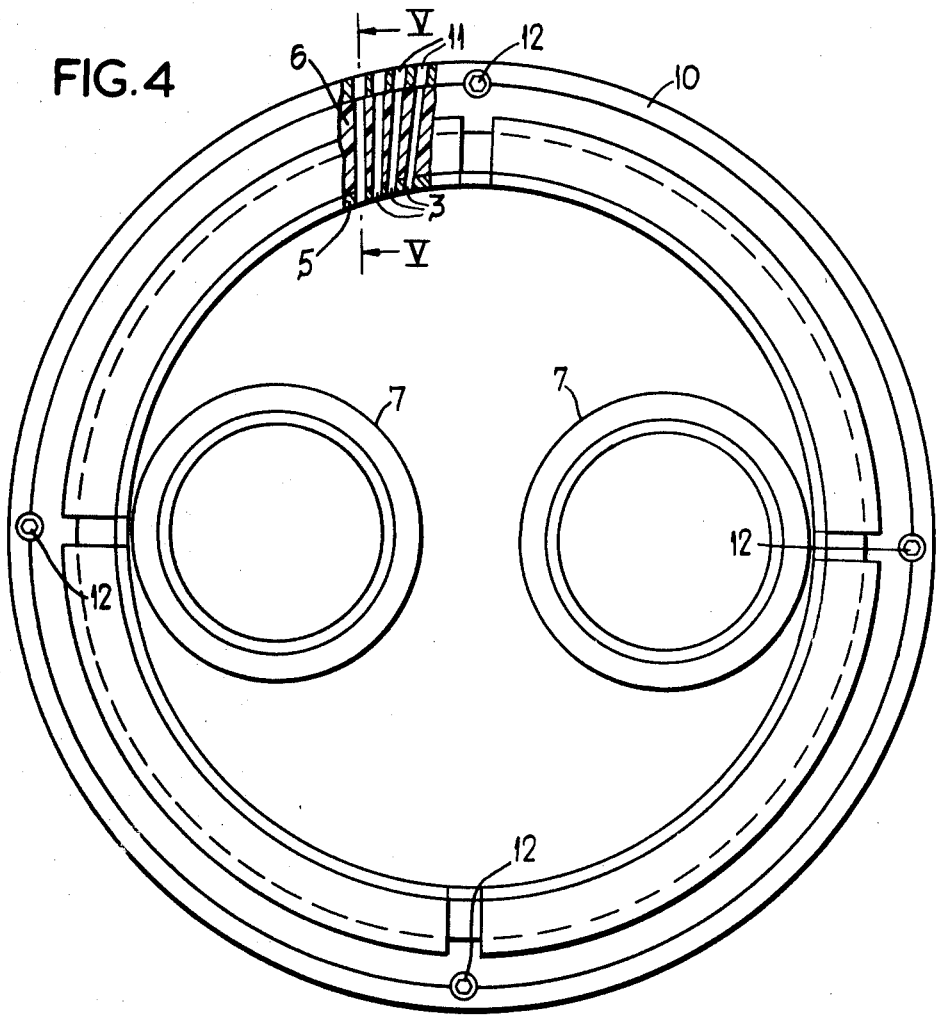
FIG. 4 shows in part section another form of die in accordance with the present invention.
Figure 5:
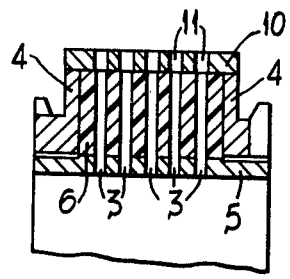
FIG. 5 is a section of a part of the die of FIG. 4 taken along the line V—V.

Referring to FIGS. 4 and 5, there is provided an outer metal band 10 which surrounds the die, including the die ring, the outer surface of which is comprised by the outer surface of the body 6 of polytetrafluoroethylene. This outer metal band 10 is preferably a band of mild steel which is made to have an internal diameter exactly equal to the outer diameter of the body 6 of polytetrafluoroethylene. The outer metal band 10 is thus one complete ring which is made to fit exactly over the outer circumference of the body 6 of polytetrafluoroethylene. When the outer metal band 10 has been positioned over the body 6 of polytetrafluoroethylene with apertures 11 in the outer metal band 10 positioned with their axes coincident with the axes of the pellet-forming apertures 3, the outer metal band 10 and the metallic flanges 4 are drilled and tapped and set screws 12 are secured in order to prevent circumferential movement of the outer metal band 10 relative to the body 6 of polytetrafluoroethylene and the metallic flanges 4.

It will be noted from FIGS. 4 and 5 that the apertures 11 in the outer metal band 10 are of a substantially larger diameter than the pellet-forming apertures 3. The pellets formed in the pellet-forming apertures 3 are therefore enabled to pass through the outer metal band 10 without coming into any contact with the outer metal band 10, so that no additional frictional force is introduced into the formation of the pellets, and the smooth surface which is imparted to the pellets by their passage through the pellet-forming apertures 3, which have walls of polytetrafluoroethylene, is unimpaired by the presence of the outer metal band 10.

The presence of the outer metal band 10, which is resistant to all the pressures which may be set up by the rollers 7 acting on the material to be pelleted, is to prevent outward movement of the body 6 of polytetrafluoroethylene and so to prevent separation of the body 6 from the metallic facing 5. Consequently it is not necessary in the manufacture of the die illustrated in FIGS. 4 and 5 of the accompanying drawings that the metallic facing 5 have such a strong force fit as was described for the die illustrated in FIGS. 1 to 3 of the accompanying drawings. However, there should be a force fit between the metallic facing 5 and the body 6 of polytetrafluoroethylene in the embodiment of FIGS. 4 and 5 in order to prevent slip between these members during operation of the die.

Figure 6:
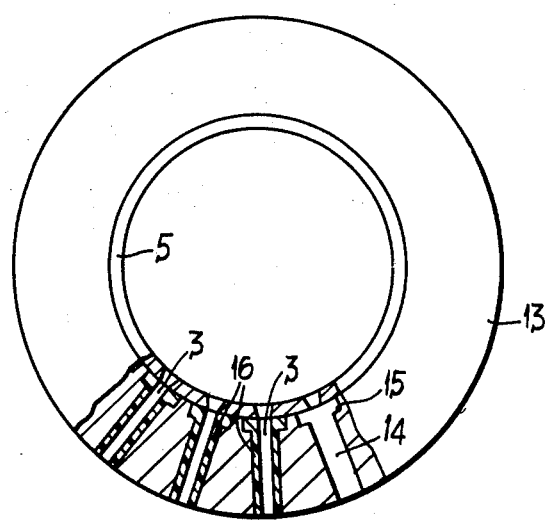
FIG. 6 shows in part section another form of die in accordance with the present invention for manufacturing pellets of larger diameter.

Another embodiment of the present invention, which is a construction which may be used when the pellets are to be of a relatively large diameter, for example 5/16 of an inch or larger, is illustrated in FIG. 6 of the accompanying drawings. FIG. 6 shows a ring former 13 of mild steel having apertures 14 formed in it of larger diameter than the diameter of the pellets which are to be produced on the die. The inner surface of the ring former 13 is countersunk at 15 in order to form a countersunk area surrounding the inner end of each of the apertures 14.

Figure 7:
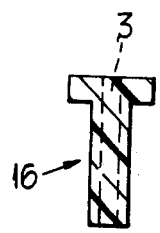
FIG. 7 is an enlarged cross-sectional view of a plug based on polytetrafluoroethylene for use in the die illustrated in FIG. 6.

Made separately are a number of polytetrafluoroethylene plugs 16 having running through them a central pellet-forming aperture 3 of a diameter equal to the diameter of the pellets which are to be produced. The plugs 16 are made by pressing polytetrafluoroethylene powder filled with glass powder and being, for example, approximately 60% by weight of polytetrafluoroethylene to 40% by weight of powdered glass in a mould so that a plug of the correct size and shape is formed. This plug is then sintered so that the polytetrafluoroethylene particles coalesce at their surfaces and a firm plug 16 is obtained. Such a polytetrafluoroethylene plug 16 is illustrated in enlarged scale in FIG. 7.

A plug 16 of polytetrafluoroethylene is inserted as a force fit into each aperture 14 and countersunk area 15 in the ring former 13, and an inner metallic facing 5, being a ring of stainless steel having funnelled or tapered apertures, is secured to the inner surface of the ring former 13 with the funnelled apertures leading directly to the pellet-forming apertures 5 in the plugs 16 of polytetrafluoroethylene.

The plugs 16 of polytetrafluoroethylene which are located in the apertures 14 are held in the desired position during operation of the die by their broad ends which fit into the countersunk areas 15.

The basic advantages of using pellet-forming apertures based on polytetrafluoroethylene, which are also present in the die of the co-pending patent application Ser. No. 599,930, include the absence of friction in the pellet-forming apertures which ensures a sliding action of the material to be pelleted over the inner surfaces of the pellet-forming apertures, and thus leads to reduction of the horsepower of the motor necessary to drive the apparatus and an increased output from the die. The polytetrafluoroethylene surfaces of the pellet-forming apertures also provide a shiny or polished surface to the pellets which are formed.

In addition to these advantages, dies in accordance with the present invention have the further advantage that the parts which have to be replaced when wear occurs are comparatively less than in the die of the co-pending patent application. In operation of the die in accordance with the present invention the bulk of the wear is taken on the metallic facing 5 which is a very small part of the whole apparatus and which is relatively inexpensive to replace.

Consequently the life of the body 6 of polytetrafluoroethylene used in the dies of the first two embodiments described herein is very substantially increased as compared with the life of a corresponding body of polytetrafluoroethylene in a die according to the co-pending patent application. Also, because the inner metallic facing 5 is replaceable when it is worn, the necessity of making adjustments when wear becomes apparent is avoided. Such adjustments were an absolute necessity when the die ring including the pellet-forming apertures was made of hardened steel, as in all currently conventional dies, in order that a reasonable life was obtained at all from the conventional die.

The die illustrated in FIG. 6 of the accompanying drawings has the further advantage over the first two embodiments of dies described in this specification in that, when wear does take place on the polytetrafluoroethylene which defines the pellet-forming apertures, then, instead of providing a whole new body 6 of polytetrafluoroethylene, it is merely necessary to replace the plugs 16 of polytetrafluoroethylene. The expense of replacing the plugs 16 of polytetrafluoroethylene is very much less than the expense of replacing a whole body of this material. The ring former 13 of the die of FIG. 6 is thus a constant item which is never subjected to wear, and once the initial cost of the die has been accepted the cost of replacement parts is comparatively very small. The replacements, nevertheless, produce effectively a new apparatus.

Experiments have shown that pelleting apparatus including a die substantially as described in the foregoing detailed description is capable of accommodating an overfeed of the material to be pelleted which would block a conventional machine having a die of hardened steel, and cause the machine to stop. It is believed that the substantial increase in the overfeed of material to be pelleted which can be accommodated by a pelleting machine, including a die in accordance with this invention, is due to the very substantial reduction in friction which occurs in the passage of the material through the pellet forming apertures having polytetrafluoromethylene walls.

I claim:

1. In or for apparatus for manufacturing pellets of material a die comprising a die ring which contains pellet-forming apertures, the walls of the pellet-forming apertures being constituted by a material selected from polytetrafluoroethylene loaded with a compatible strengthening material in powdered form and materials having essential properties similar to such loaded polytetrafluoroethylene, and a metallic facing having apertures arranged to correspond to the pellet-forming apertures, the metallic facing being replaceably secured to the die ring such that the apertures in the metallic facing define inlets to the pellet-forming apertures.

2. In or for apparatus for manufacturing pellets of material a die comprising a die ring which contains pellet-forming apertures, the die ring being comprised by an inner replaceable metallic facing and an outer body of loaded polytetrafluoroethylene, whereby the pellets are essentially formed in contact with polytetrafluoroethylene walls to the pellet-forming apertures.

3. A die according to claim 2, wherein the die ring containing the pellet-forming apertures is mounted between metallic flanges.

4. A die according to claim 3, wherein the replaceable metallic facing has extension flanges having screw threads for co-operating with corresponding screw threads on the metallic flanges whereby the die comprising the die ring and the metallic flanges is assembled.

5. A die according to claim 2, wherein a circumferential metal band surrounds the die ring in close contact with the outer circumferential surface of the die ring and prevents separation of the die ring from the metallic facing, the metal band having apertures in alignment with the pellet-forming apertures and of greater diameter than the pellet-forming apertures.

6. A die according to claim 2, wherein the apertures in the metallic facing are funnelled so as to have a diameter which decreases in the direction from the inner surface of the metallic facing to the outer surface.

7. A die according to claim 2, wherein the walls of the pellet-forming apertures are constituted by polytetrafluoroethylene loaded with a compatible strengthening material in a ratio of two parts by weight of strengthening material to three parts by weight of polytetrafluoroethylene.

8. A die according to claim 2, wherein the walls of the pellet-forming apertures are constituted by polytetrafluoroethylene loaded with powdered glass.

9. In or for apparatus for manufacturing pellets of material a die comprising a ring former of metal having apertures therethrough of a size greater than the diameter of the pellets which are to be formed, the ring former having a countersunk area around the inner end of each aperture, plugs of loaded polytetrafluoroethylene located one in each aperture including the countersunk area and defining a pellet-forming aperture, and a replaceable metallic facing located within the ring former, secured in contact with the ring former and the polytetrafluoroethylene plugs, and having apertures in alignment with the pellet-forming apertures.

10. A die according to claim 9, wherein the apertures in the metallic facing are funnelled so as to have a diameter which decreases in the direction from the inner surface of the metallic facing to the outer surface.

11. A die according to claim 10, wherein the diameter of each funnelled aperture in the metallic facing at the outer surface of the facing is substantially equal to the diameter of the pellet-forming aperture in the polytetrafluoroethylene.

12. A die according to claim 9, wherein the walls of the pellet-forming apertures are constituted by polytetrafluoroethylene loaded with a compatible strengthening material in a ratio of two parts by weight of strengthening material to three parts by weight of polytetrafluoroethylene.

13. A die according to claim 9, wherein the walls of the pellet-forming apertures are constituted by polytetrafluoroethylene loaded with powdered glass.

14. Apparatus for use in a process for manufacturing pellets of material by compacting the material under pressure without application of heat and by forcing the compacted material through pellet-forming apertures, comprising a cylindrical die adapted to be driven for rotation about the axis of the cylinder, the cylindrical die including a cylindrical die ring which contains pellet-forming apertures having walls constituted by polytetrafluoroethylene loaded with a compatible strengthening material in powdered form or by a material having essential properties similar to such loaded polytetrafluoroethylene, the inner cylindrical surface of the die ring being constituted by a replaceable metallic facing having apertures corresponding to the pellet-forming apertures and so located as to define the inlets to the pellet-forming apertures, rollers mounted for rotation within the cylindrical die about axes parallel to the axis of the cylinder, means for feeding the material to be pelleted axially into the cylindrical die for engagement between the driven cylindrical die and the rollers, whereby the material is compacted and forced through the pellet-forming apertures having walls of loaded polytetrafluoroethylene or similar material by the rollers, and knife means located immediately beyond the outer circumference of the cylindrical die ring for cutting the pelleted material into desired lengths.

References Cited

UNITED STATES PATENTS

| | | |
|---|---|---|
| 2,604,662 | 7/1952 | Bodkin. |
| 3,168,058 | 2/1965 | Cunningham. |
| 3,447,486 | 6/1969 | Wooding et al. |

FOREIGN PATENTS

| | | |
|---|---|---|
| 1,464,146 | 11/1966 | France. |

WILLIAM J. STEPHENSON, Primary Examiner

U.S. Cl. X.R.

107—14